United States Patent [19]
Kohut et al.

[11] Patent Number: 5,327,182
[45] Date of Patent: Jul. 5, 1994

[54] METHOD AND APPARATUS FOR READING PHOTOGRAPHICALLY RECORDED DIGITAL AUDIO SOUNDTRACKS

[75] Inventors: Michael Kohut, Ojai; Dana Wood, Los Angeles; Paul Wood, Glendale; Jeff Taylor, Chatsworth; Leroy Reese, Burbank; Aram Tanielian, Rancho Palos Verdes; Jaye M. Waas, Manhattan Beach; Mark Waring, Torrance; George Carlsen, Cardiff, all of Calif.

[73] Assignee: Sony Electronics, Inc., Park Ridge, N.J.

[21] Appl. No.: 896,229

[22] Filed: Jun. 10, 1992

[51] Int. Cl.$^5$ .................. G03B 31/02; G06F 11/00
[52] U.S. Cl. .................................... 352/27; 352/37; 371/10.2
[58] Field of Search ............. 352/26, 27, 29, 30, 352/37, 92, 236; 369/93, 95, 97, 98, 59; 371/10.1, 10.2, 10.3, 40.1

[56] References Cited

U.S. PATENT DOCUMENTS

| | | | |
|---|---|---|---|
| 3,502,398 | 3/1970 | Michelson | 352/37 |
| 3,932,032 | 1/1976 | Weinstein | 352/11 |
| 4,074,085 | 2/1978 | Russell | 369/95 |
| 4,202,018 | 5/1980 | Stockholm, Jr. | 371/10.1 |
| 4,306,781 | 12/1981 | Mosely | 352/37 |
| 4,461,552 | 7/1984 | Levine | 352/27 |
| 4,491,399 | 1/1985 | Bell | 352/92 |
| 4,553,833 | 11/1985 | Kanaoka et al. | 355/40 |
| 4,600,280 | 7/1986 | Clark | 352/37 |
| 4,659,198 | 4/1987 | Beauviala et al. | 352/92 |
| 4,870,633 | 9/1989 | Matsushita et al. | 369/59 |
| 4,893,921 | 1/1990 | Beauviala | 352/92 |
| 5,155,510 | 10/1992 | Beard | 352/27 |

FOREIGN PATENT DOCUMENTS

| | | |
|---|---|---|
| 0544090A1 | 6/1993 | European Pat. Off. |
| WO91/16709 | 10/1991 | World Int. Prop. O. |
| 92/06409 | 4/1992 | World Int. Prop. O. |
| WO92/14239 | 8/1992 | World Int. Prop. O. |

OTHER PUBLICATIONS

"Digital-Optical Data Makes Movies Sound Better," *Machine Design*, Feb. 21, 1991, vol. 63, No, 4, Cleveland, Ohio, US, pp. 30-31.

"Cinema Digital Sound—Premiere eines neuen Lichttonverfahrens in Brussel," *Fernesh-Und Kino-Technik*, Jan, 1991, vol. 45, No. 1, Heidelberg, Germany, pp. 30-33, 36 and 37 (not translated).

Dr. Ing. Klaus-Peter Andere, "DOSCAR—A Digital Optical Sound Technique," *Image Technology* (Journal of the BKSTS), Jun. 1991, vol. 73, No. 6, London, Great Britain, pp. 208-213.

"Cinema Digital Sound," *Image Technology* (Journal of the BKSTS), Jul. 1990, vol. 72, No. 7, London, Great Britain, pp. 69-70.

Primary Examiner—M. L. Gellner
Assistant Examiner—Eddie C. Lee
Attorney, Agent, or Firm—Limbach & Limbach

[57] ABSTRACT

A method and apparatus for reading digital audio signals photographically recorded on a medium (such as motion picture film). If the medium has multiple, spatially separated digital and analog audio soundtracks, a photosensitive detector array is employed for each of the digital audio soundtrack areas, and a separate analog soundtrack read head is employed. Preferably, digital error code is recorded in a digital soundtrack area of the medium (with digital audio bits), and error detection and correction are performed on the recorded digital audio bits read from the medium. Preferably, the apparatus includes switching circuitry for substituting a corresponding analog audio signal for one or more corrupted digital soundtrack channels, when such digital soundtrack channels have an error rate which exceeds a selected threshold. Also preferably, the invention reads recorded digital audio information by projecting a laser beam (having a near infrared wavelength) on a row of a digital soundtrack area of a motion picture film, to modulate the beam as it passes through the row. The radiation transmitted through each digital soundtrack bit area is projected onto a spot in the detector plane that is substantially larger than the dimension of each individual detector which receives the spot. As the film translates continuously relative to the radiation source so that the projection of the spot translates relative to each receiving detector, the output of each receiving detector is integrated over the period during which a portion of the spot is projected thereon.

11 Claims, 10 Drawing Sheets

DIGITAL CLOCKING AND TRACKING BIT LAYOUT

METHOD AND APPARATUS FOR READING PHOTOGRAPHICALLY RECORDED DIGITAL AUDIO SOUNDTRACKS

FIELD OF THE INVENTION

The invention relates to methods and apparatus for reading photographically recorded digital audio signals. In one embodiment the method and apparatus of the invention reads multiple digital and analog audio soundtracks photographically recorded on motion picture film.

BACKGROUND OF THE INVENTION

The photographic recording of digital soundtracks on motion picture film has been proposed. For example, U.S. Pat. No. 4,600,280, issued Jul. 15, 1986, describes a technique for recording a digital soundtrack on a film strip by exposing the film to modulated light from a light source. In one method disclosed in U.S. Pat. No. 4,600,280, an intermittent light beam (encoded with digital audio information) is scanned horizontally across the film, and the film is then advanced vertically and the scanning process repeated. U.S. Pat. No. 4,600,280 suggests alternatively that the light can be projected on the film through a linear array of solid state shutters or Bragg cell modulators.

U.S. Pat. No. 4,461,552, issued Jul. 24, 1984, also discloses a method in which digital audio is photographically recorded on motion picture film.

It has also been proposed to photographically record other types of digital information on photographic film. For example, U.S. Pat. No. 4,553,833, issued Nov. 19, 1985, discloses a method for photographic recording of characters and symbols on photographic film. In this method, light emitted from a relatively large-sized array (such as a light emitting diode array) is focused through converging lenses, to cause a relatively small-sized dot pattern to be projected on the film.

U.S. Pat. No. 4,306,781, issued Dec. 22, 1981, suggests recording a command data track (track 11 shown in FIG. 2) on motion picture film, along with an unmodulated locator track (track 5 shown in FIG. 2) and several analog soundtracks. Similarly, both U.S. Pat. No. 4,659,198, issued Apr. 21, 1987, and U.S. Pat. No. 4,893,921, issued Jan. 16, 1990, disclose a process for recording digital data along an edge portion of a strip of cinematographic film.

U.S. patent application Ser. No. 07/896,412, entitled "Method and Apparatus for Photographically Recording Digital Audio and a Medium having Photographically Recorded Digital Soundtracks," filed on the same day as the present application, and assigned to the assignee of the present application, also discloses a method and apparatus for photographically recording digital audio signals, and a medium having digital audio signals photographically recorded thereon.

Until the present invention, however, it had not been known how accurately to read multiple channels of digital audio information on a continuously translating motion picture film. Nor had it been known how efficiently to perform error detection and correction on one or more channels of digital audio information read from a continuously translating motion picture film.

SUMMARY OF THE INVENTION

The invention is a method and apparatus for reading digital audio signals photographically recorded on a medium (such as motion picture film). The invention permits accurate reading of multiple, photographically recorded digital and analog audio soundtracks, by employing a photosensitive detector array (such as a CCD array) for each of the digital audio soundtrack areas, and a separate means for reading the analog soundtrack (or soundtracks).

In a preferred embodiment of the invention, digital error detection and correction bits are recorded in a digital soundtrack area of the medium (along with digital audio bits), and error detection and correction are performed on the recorded digital audio bits read from the medium. Preferably, the inventive apparatus includes a means for substituting a corresponding analog signal for one or more corrupted digital soundtrack channels, when one or more digital soundtrack channels have an error rate which exceeds a selected threshold.

In a class of preferred embodiments of the invention, recorded digital audio information is read by projecting a laser beam (preferably having a near infrared wavelength) on a row of a digital soundtrack area (of a motion picture film), to modulate the beam as it passes through the row. The modulated beam is then expanded by a lens system (to increase its waist dimension) and the expanded, modulated beam is projected on a photosensitive detector array. Use of laser radiation for this purpose has substantial optical benefits over use of incandescent lamp radiation, including longer source lifetime, and greater uniformity, stability, and reliability. If a single laser beam is employed to illuminate two or more spatially separated digital soundtrack areas, optical elements are employed to split the beam and direct each beam portion from one of the digital soundtrack areas to a different detector array.

In a preferred embodiment, the radiation transmitted through each bit area of a digital soundtrack area is projected onto a spot (in the detector plane) that is substantially larger than the dimension of each individual detector which receives the radiation (the "receiving" detector). Each spot preferably covers the full width of three adjacent receiving detectors. As the film translates continuously relative to the fixed radiation source (so that the projection of the spot translates continuously relative to the three receiving detectors), the apparatus integrates the output of the three receiving detectors over the period during which a portion of the spot is projected thereon.

Preferably, a passive vacuum means is employed to clean the film before it is illuminated (and read). In a preferred embodiment, the film transport means rotates the vacuum means, thereby causing the vacuum means to generate a "knife edge" low pressure region at the location of the film to be cleaned.

In another preferred embodiment, when the film transport mechanism ceases to translate the film being read, means within the inventive apparatus automatically cuts off the supply of power to the source of radiation for illuminating the film.

DETAILED DESCRIPTION OF THE PREFERRED EMBODIMENTS

Figure 1:
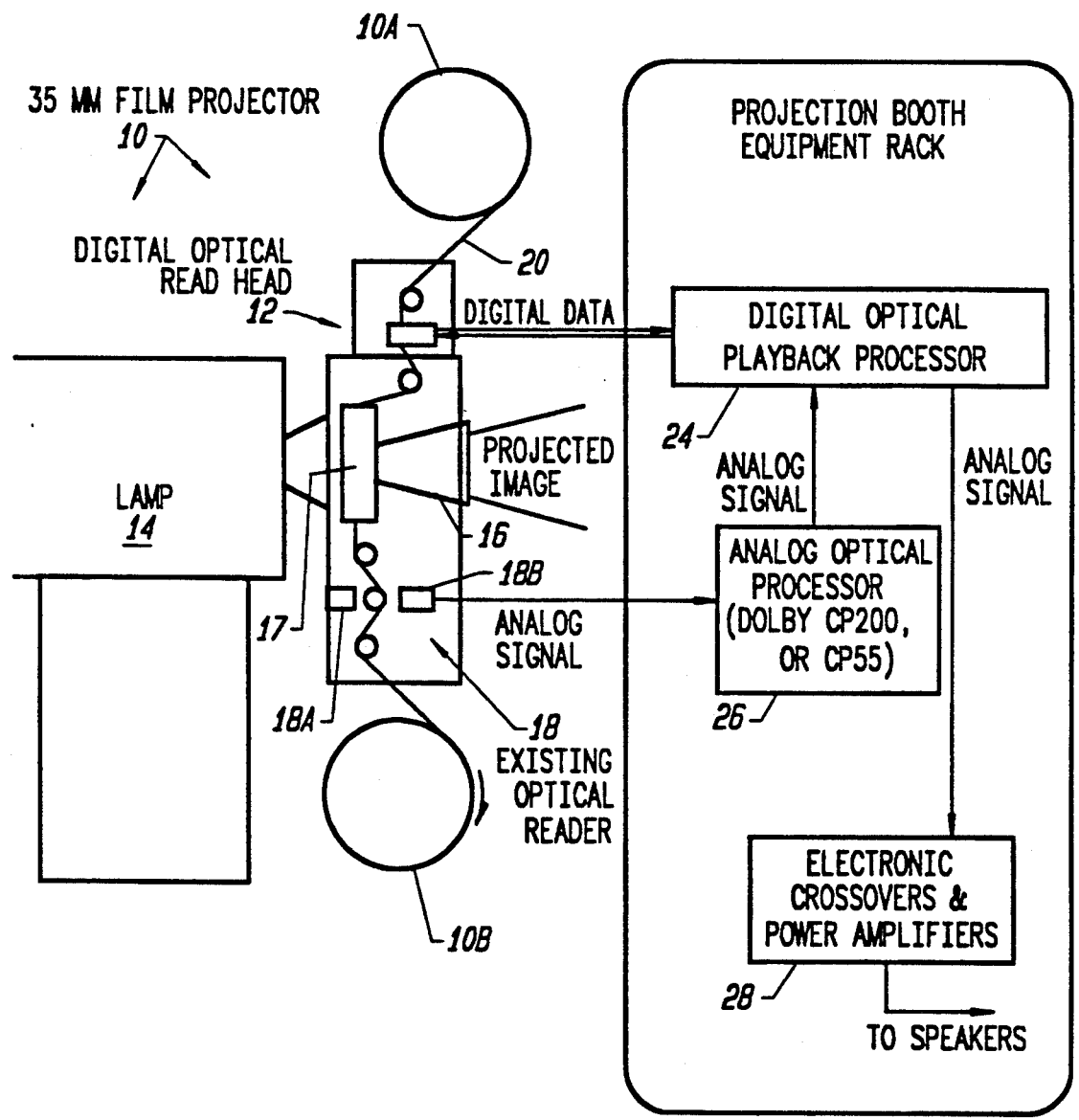
FIG. 1 is a block diagram of a preferred embodiment of the inventive apparatus for reading photographically recorded digital and analog audio signals.

A preferred embodiment of the inventive apparatus for reading photographically recorded digital and analog audio signals will be described with reference to FIG. 1. Motion picture film projector 10 includes feed reel 10a and take-up reel 10b, digital optical read head 12, incandescent lamp 14, projection lens system 16, apertured element 17, and analog optical read head 18. As take-up reel 10b rotates clockwise, it pulls film 20 along a path from feed reel 10a, through digital optical read head 16, past lamp 14 and element 17, and through analog optical read head 18.

Image frames, one or more digital soundtracks, and one or more analog soundtracks, are photographically recorded on film 20 before it is wound on feed reel 10a. The techniques described in above-referenced U.S. patent application Ser. No. 07/896,412, entitled "Method and Apparatus for Photographically Recording Digital Audio and a Medium having Photographically Recorded Digital Soundtracks," can be used to record the digital soundtracks photographically on a negative film, and then to generate a print from the negative. Any conventional photographic technique can be used to record the analog soundtracks and image frames on the film.

Digital optical read head 12 (described below in detail with reference to FIGS. 10 and 11) transmits a beam of coherent radiation through the digital soundtrack areas of film 20, and then projects the modulated beam onto a detector array. The stream of digital output data from the detector array is supplied to digital optical playback processor 24 (described below in detail with reference to FIG. 6).

Film 20 continuously advances from read head 12 past apertured element 17. As each frame in the film's picture area translates past element 17, the image recorded in the frame is projected on a screen (not shown). This is accomplished by transmitting pulses of light from incandescent lamp means 14 through an aperture in element 17, and through the picture area of continuously advancing film 20. Projection lens system 16 projects the resulting modulated light pulses onto the display screen.

Film 20 continuously advances from element 17 through analog optical read head 18, to take-up reel 10b. Within read head 18, radiation source 18a (typically, an incandescent lamp) illuminates the film's analog soundtrack area. The radiation is modulated as it passes through the analog soundtrack area, and the modulated radiation signal is received by analog detector means 18b. The analog output signal produced by detector means 18b undergoes conventional processing within analog optical processor 26. The processed analog output signal asserted at the output of processor 26 is supplied to digital optical playback processor 24.

A digital-to-analog converter within processor 24 converts the digitally processed digital soundtrack data into analog form. Either the resulting analog signals (representing digital soundtrack channels), or the signals representing analog soundtrack channels from circuit 26, are selected by backup switching means (to be described below with reference to FIG. 6) within circuit 24. The analog output of such backup switching means is supplied to circuit 28. Crossover circuitry within circuit 28 selects desired ones of the analog soundtrack channels, and amplification circuitry within circuit 28 amplifies the selected audio channels, and outputs the amplified audio to a set of loudspeakers (not shown).

In a preferred embodiment, four analog channels read by analog optical reader 18 represent the same soundtrack (represented by digital audio bits in digital soundtrack areas of the film) that is read by digital optical read head 12. Preferably, the digital audio bits are recorded in synchronization with the corresponding analog audio signal. For example, the digital bits representing the soundtrack for one film (picture) frame of the film can be recorded twenty-two film frames ahead of the corresponding analog soundtrack for the same film frame. In this example, digital read head 12 is positioned a distance of twenty-two film frames above analog optical reader 18a, 18b. The digital data from read head 12 can undergo a selected delay period within processor 24, so that the digital data will be asserted at the inputs of the backup switching means within processor 24 at the same time the corresponding analog information is supplied to the same backup switching means within processor 24.

Processor 26 can be a conventional analog matrix decoder, such as the "CP200" or the "CP55" product available from Dolby Laboratories. Suitable versions of components 10a, 10b, 14, 16, 17, and 18 of the FIG. 1 apparatus can also be selected from commercially available products.

Figure 2:
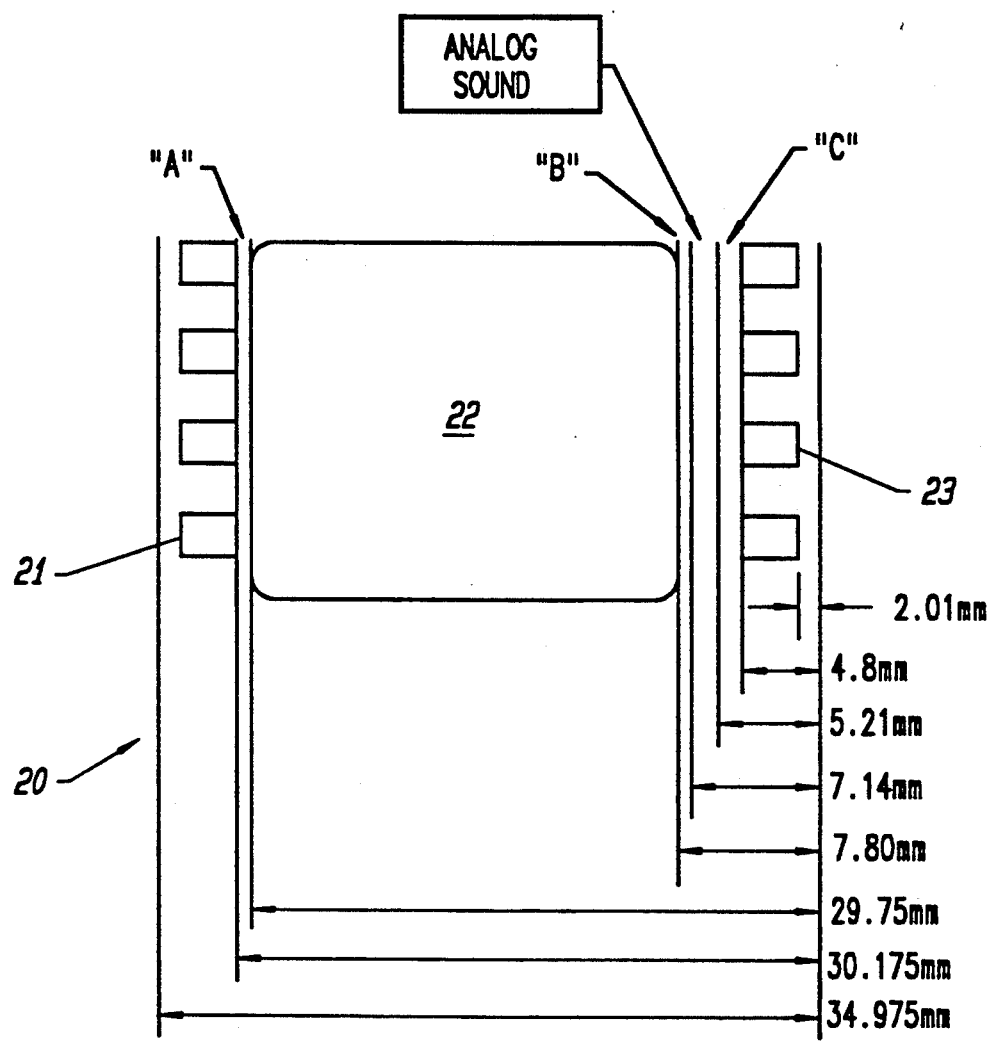
FIG. 2 is an elevational view of a section of motion picture film, on which three digital soundtracks and one analog soundtrack have been recorded.

In a class of preferred embodiments, motion picture film 20 has multiple digital soundtracks (for example, in three separate digital soundtrack areas), and an analog soundtrack, as shown in FIG. 2. In FIG. 2, film 20 has sprocket holes 21 along its left edge, sprocket holes 23 along its right edge, and a picture area for recording image (picture) frames 22 between rows of sprocket holes 21 and 23. Preferably, the analog soundtrack is recorded in a conventional manner between the picture area and the row of sprocket holes 23.

Either a single soundtrack or two or more soundtracks can be recorded in each of the digital soundtrack areas. However, for the sake of convenience we will sometimes refer to each digital soundtrack area as a "digital soundtrack."

Unexposed film 20 is preferably conventional black and white motion picture film, and is preferably "35 mm" motion picture film which has standard dimensions including the following (as indicated in FIG. 2): an overall film width of 34.975 mm, a distance of 2.01 mm between the outer edge of each sprocket hole and the film edge nearest thereto, and a distance of 4.80 mm between the inner edge of each sprocket hole and the film edge nearest thereto. These standard film dimensions are set forth in the "American Standards and Recommended Practices of the Society of Motion Picture and Television Engineers" for 35 mm motion picture film.

In a preferred embodiment, the inventive reading apparatus is designed to read soundtracks from film 20 having digital soundtrack areas "A," "B" and "C," shown in FIG. 2. Digital soundtrack area "A" in FIG. 2 is positioned between the picture area (the central strip of the film including frames 22) and row of sprocket holes 21. The other two digital soundtrack areas (soundtracks "B" and "C" in FIG. 2) are positioned between the picture area and row of sprocket holes 23, with an analog soundtrack between the two digital soundtracks "B" and "C."

When unexposed film 20 has the above-mentioned SMPTE standard 35 mm film format, track "A" is positioned in the strip (having width 0.475 mm) between the picture area and the inner edges of holes 21, and tracks "B" and "C" are positioned between the picture area and the inner edges of holes 21 (with track "B" positioned within the strip extending between 7.14 mm and 7.80 mm from the right edge of the film, and track "C" positioned within the strip extending between 4.80 mm and 5.21 mm from the right edge of the film). In this embodiment, the analog soundtrack is positioned within the strip extending between 5.21 mm and 7.14 mm from the right edge of the film.

Figure 3:
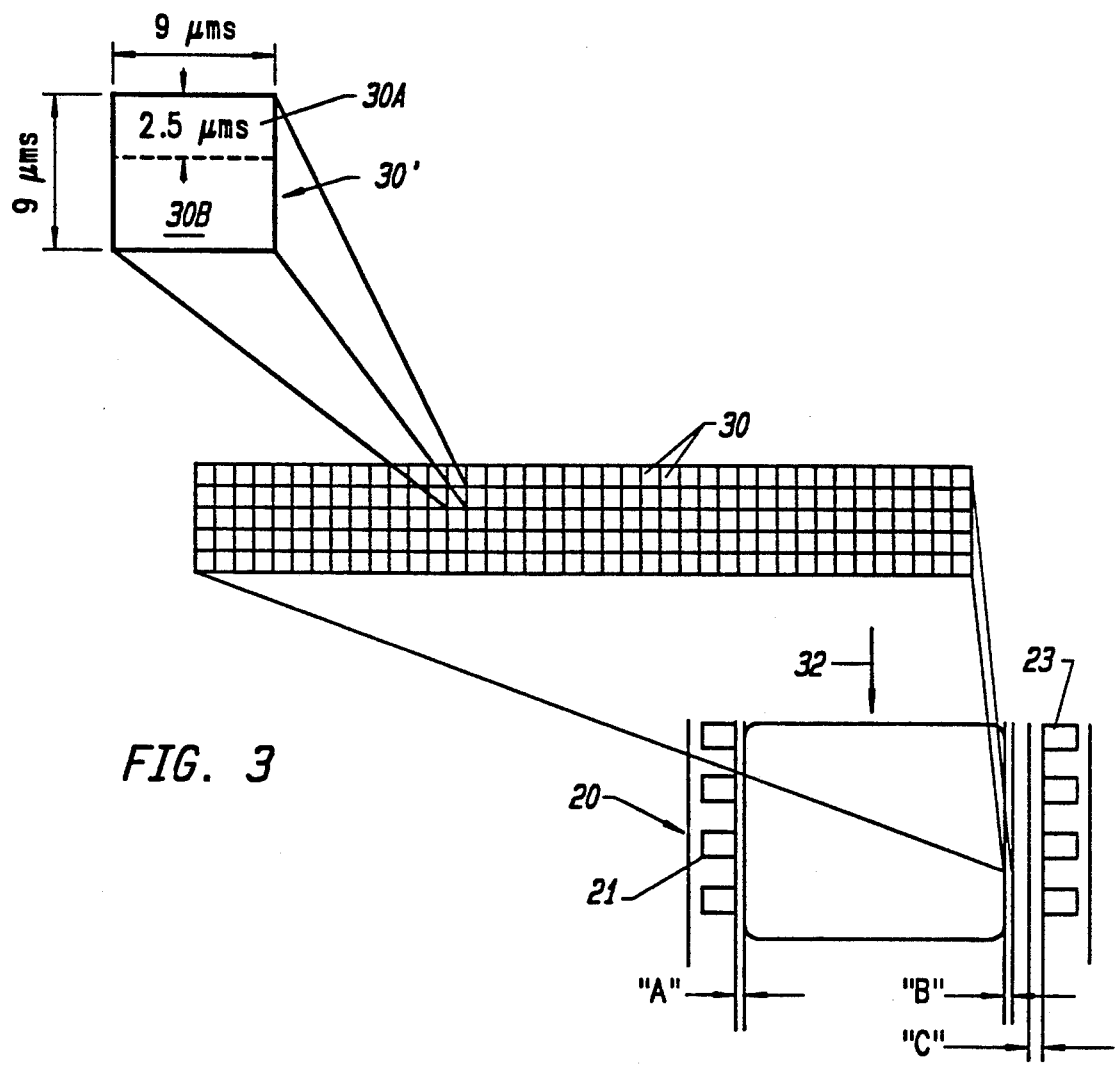
FIG. 3 is a diagram illustrating the size and shape of the bit regions comprising each of the digital soundtracks of FIG. 2.

Each of the three digital soundtrack areas is an array of bit areas arranged in row and column order. The portion of area "B" shown in enlarged view in FIG. 3 includes five horizontally oriented rows of square-shaped bit areas 30. Each row (of the enlarged portion shown in FIG. 3) comprises forty bit areas 30, so that the portion of area "B" shown in this enlarged view is a grid of five rows and forty columns of bit areas. One digital audio bit is recorded in each bit area 30.

In one embodiment, each bit area has a length (in the vertical direction in FIG. 3) of 9 microns, and width (in the horizontal direction in FIG. 3) of 9 microns. The inventive reading apparatus can be designed to read bits from individual bit areas having a variety of sizes and shapes.

The inventive reading apparatus can be designed to read bits from digital soundtrack areas having any number of rows and columns. The rows can be arranged with no space between them (as in FIG. 3), or with unexposed horizontal strips between them.

In the embodiment described above in which each bit area has size 9×9 microns, if the film is transported continuously at a conventional rate of 24 picture frames per second during recording, the inventive apparatus can read digital audio data with an absolute bit density of 50,847 bits per second (per column of bits). If the digital audio sample rate is 48,000 samples per second, there is room in the digital soundtrack areas for recording 2847 extra rows of digital data per second, which can also be read by the inventive apparatus. These extra rows can be uniformly divided vertically (i.e., in the direction of film transport) along the digital soundtrack areas, and used to allow a small mechanical tolerance of exact film position during the reading processes.

Figure 5:
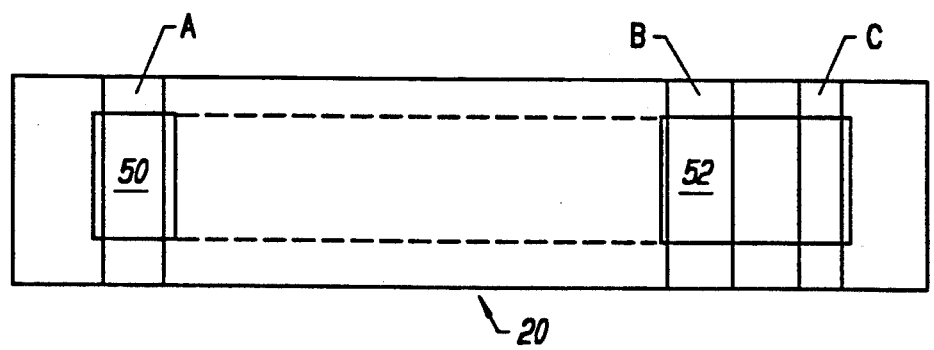
FIG. 5 is a schematic diagram of a portion of the recorded film shown in FIG. 2, indicating two blocks of digital bits in which error detection and correction bits, as well as digital audio bits have been recorded.

In one embodiment, the invention reads digital soundtrack areas "A" "B" and "C" which together have a total of 165 columns of bit areas, with a total of eight parallel, 16-bit digital soundtracks (i.e., eight audio "channels") recorded therein. Each channel is recorded in a different group of sixteen columns. The invention also reads additional digital bits for clocking, tracking, error detection and correction, or other functions, which are recorded in the remaining thirty-seven columns (as explained below with reference to FIGS. 4 and 5).

If each bit area has a width of 9 microns, soundtrack area "A" can include 47 columns (so that it has a width of 425 microns), soundtrack area "B" can include 73 columns (so that it has a width of 660 microns), and soundtrack area "C" can include 45 columns (so that it has a width of 410 microns). The eight digital soundtrack channels can be recorded in the three areas as indicated in Table 1:

TABLE 1

| 16-Bit Channel | Soundtrack Area | Location Within Area |
| --- | --- | --- |
| Sub Woofer ("Boom") | A | Adjacent to sprockets |
| Right/Center | A | Adjacent to picture area |
| Surround Left | B | Adjacent to picture area |
| Right | B | Between "Surround Left" and "Center" channels |
| Center | B | Between "Right" and "Left" channels |
| Left | B | Adjacent to analog soundtrack |
| Surround Right | C | Adjacent to analog soundtrack |
| Left/Center | C | Adjacent to Sprockets |

In this embodiment, the frequency range of digital data recorded on the film is from 2 Hz to 24,000 Hz. Typical embodiments of the inventive reader apparatus will be designed to support an output frequency range of at least 20 Hz to 20,000 Hz.

Boundaries of at least 0.001 inches will typically be provided between the edge of each digital soundtrack area and its neighbor (an edge of the analog soundtrack, the picture area, or a sprocket hole). This enables the inventive reading apparatus to avoid undesirable "buzz" which can occur if the means for reading the analog track encounters the digital audio data, and uneven digital data quality which can result if the digital soundtrack reading means is subject to noise from neighboring areas.

In a class of embodiments, the invention employs three independent detector arrays to read the recorded digital data: one for each of the "A," "B," and "C" soundtrack areas.

Figure 4:
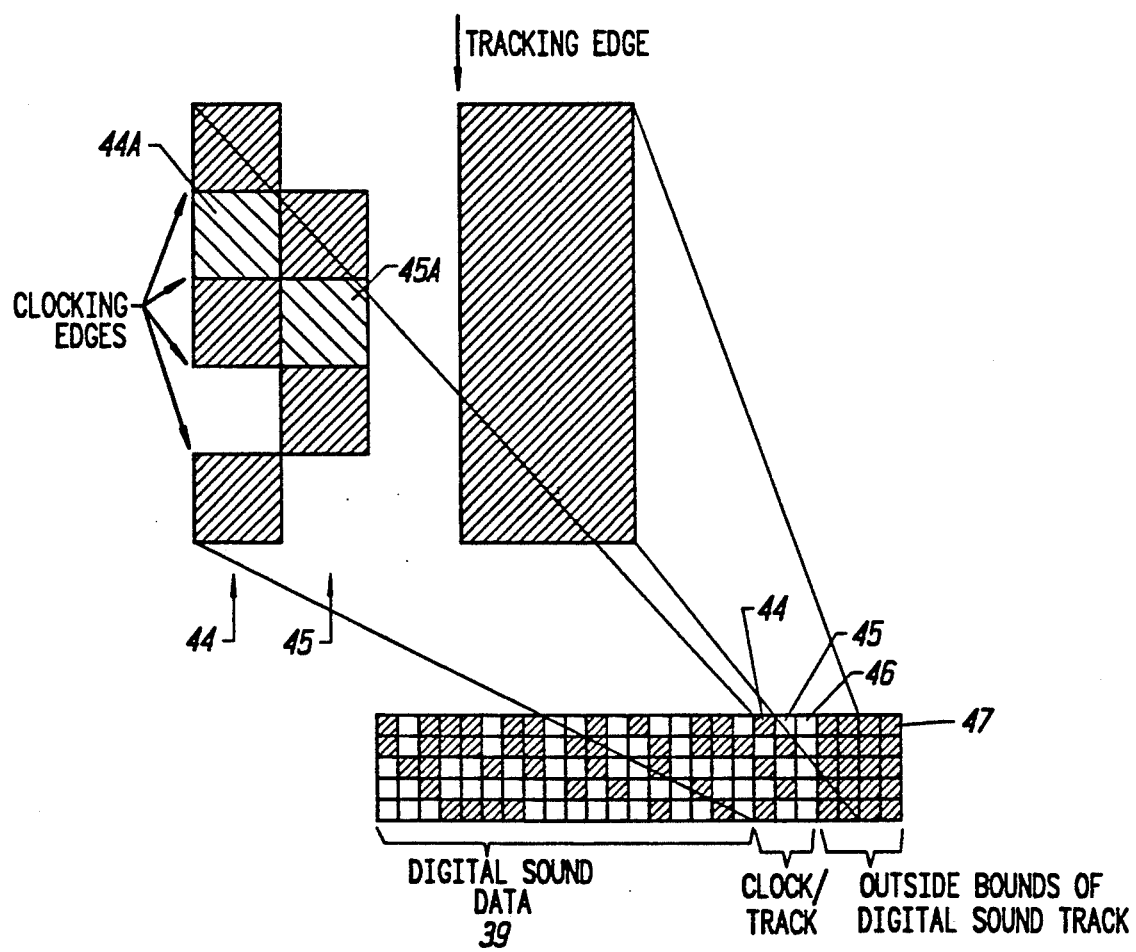
FIG. 4 is a detailed view of a portion of a preferred embodiment of one of the digital soundtracks of FIG. 2.

Specific columns of both the "A" area and the "B" area will typically contain recorded clocking and tracking bits. FIG. 4 shows three such columns of clocking and tracking bits, which are recorded alongside digital audio data 39 (representing audio data within the "A" area or the "B" area).

The clocking bits in columns 44 and 45 of FIG. 4 are sometimes referred to as a "clocking track," and have a differential, alternating bit pattern. This bit pattern provides periodically spaced event transitions, each from a black (unexposed) film area to a white (exposed) film area, which give a physical reference to the location and occurrence time of each row of digital audio data bits.

All the bit areas of the outermost column of soundtrack area "A" or "B" (represented by column 46 in FIG. 4) are exposed to light during the recording process. Thus, this column (sometimes referred to herein as a "guide track") defines a smooth edge of exposed film (referred to herein as a "tracking edge") which contrasts with adjacent region 47 of unexposed film.

Signals from a pair of detectors (of detector array 70, 72, or 74 of FIG. 10) positioned to receive radiation from bit areas straddling the expected location of the tracking edge are processed within processor 24 while the film translates past the detectors, together with clocking signals (from other detectors) representing detected clocking track edges. As a result of processing such detected bits, the expected total tracking error in reading the recorded digital audio bits using the inventive apparatus should be no more than about 1 micron. If tracking is lost, for example upon encountering a film splice, it is expected that recovery of tracking can be accomplished within five clock cycles.

An important aspect of the invention is the reading and processing of error detection and correction code ("error code") recorded with the digital audio bits, to perform error detection and correction as part of the operation of reading the recorded bits. Error detection and correction is desirable to compensate for original defects in new "theater ready" prints, film wear, contamination by dust or the like, and film splicing.

In one class of embodiments, error detection and correction code (such as Reed-Solomon error code) is recorded photographically on the film with one or more blocks of the digital audio data. Examples of such blocks of data include the first data block recorded in subset 50 (shown in FIG. 5) of soundtrack area "A," and the second data block recorded in subset 52 (shown in FIG. 5) of soundtrack areas "B" and "C." A first set of Reed-Solomon error detection and correction code ("error code") is recorded with the first block of data within subset 50, and a second set of Reed-Solomon error code is recorded with the second block of data within subset 52 (typically, neither digital audio data nor error code is recorded within the analog soundtrack area between areas "B" and "C"). At the time the recorded first and second blocks of data are read, processor 24 processes the first set of error code to identify errors occurring in the first block (and optionally to determine an error rate for the first block), and the second set of error code to identify errors occurring in the second block (and optionally to determine an error rate for the second block).

Embodiments of the invention can be designed to process error code from first and second blocks (i.e., to perform error detection independently on the two blocks) which comprise approximately equal numbers of bits. For example, the first block can include four digital audio channels recorded in area "A" and part of area "B," and the second block can include four digital audio channels recorded in the other part of area "B" and in the adjacent portion of area "C."

In the embodiments of the two previous paragraphs, two separate sets of error code are recorded in one vertical strip of film 20. Alternatively, more than or less than two sets of error code could be recorded in such vertical strip. For example, a single error code set might be recorded entirely in the "B" soundtrack area (and not in the "A" or "C" areas). Processor 24 can be operated in a mode in which it processes error code only from this single soundtrack area.

The digital audio bits and the error code bits can be grouped into "odd" blocks and "even" blocks, which are recorded on the film in an interleaved manner. Processor 24 can efficiently reorder the recorded interleaved bits to facilitate error detection and error correction, by recognizing special marker bits which have been photographically recorded in the clock tracks (i.e., clock tracks 44 and 45 in FIG. 4) to mark the top and/or bottom rows of each of the odd and even blocks. For example, processor 24 can recognize a set of first marker bits periodically recorded in one clock track to mark the first row of each odd block (one such "first" marker bit is shown in bit area 44a of track 44 of FIG. 4), and a set of second marker bits can be periodically recorded in another clock track to mark the first row of each even block (one such "second" marker bit is shown in bit area 45a of track 45 of FIG. 4).

Figure 6:
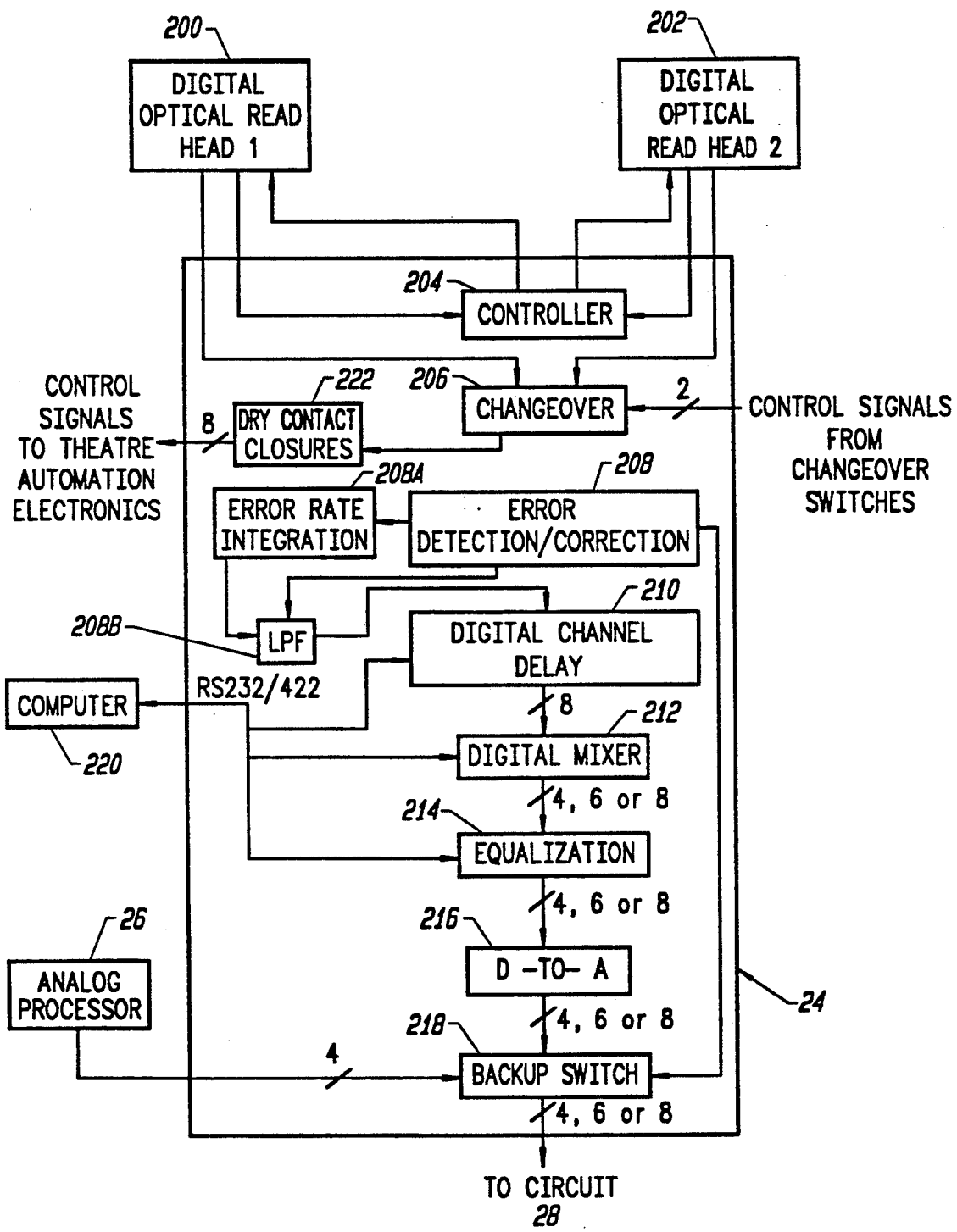
FIG. 6 is a block diagram of another preferred embodiment of the inventive apparatus.

A preferred embodiment of digital optical playback processor 24 will be described with reference to FIG. 6. The FIG. 6 embodiment of processor 24 receives digital audio soundtrack signals from digital optical read heads 200 and 202, which can be identical to read head 12 of FIG. 1. The digital output of either one of read heads 200 and 202 is selected in digital changeover circuit 206 in response to remotely generated control signals. In a preferred embodiment, the system of FIG. 6 is installed in a conventional "changeover" theater installation having two identical motion picture projectors. After one of the projectors completes projection of a reel of motion picture film, the other projector is activated by a control signal from a changeover switching means. Dry mechanical closures within the changeover switching means provide control signals to circuit 206, which indicate which projector is currently projecting a picture onto the screen, and thus which of outputs of read heads 200 and 202 should be selected by circuit 206. The output signal selected by circuit 206 is supplied to circuits 208 and 222 for further processing.

Alternatively, the system of FIG. 6 can be installed in a conventional "platter" theater installation having a single motion picture projector. In this case, only one of read heads 200 and 202 is active, and the output of the active read head is supplied directly to circuits 208 and 222.

In a preferred embodiment, detectors within read heads 200 and 202 (i.e., detector 119 to be discussed below with reference to FIG. 10) generate feedback signals indicative of whether film is translating through the read heads. These feedback signals are supplied to control circuitry 204. In the event that film has ceased to translate through a selected read head (for example, due to film breakage), control circuitry 204 sends a control signal to the selected read head to shut off power to the lasers within it. This feedback control technique enables the lifetime of the lasers to be maximized. Control circuitry 204 optionally also supplies additional control signals to read heads 200 and 202.

Digital error detection and correction means 208 performs error detection and correction operations (of the type described above) on the data it receives from circuit 206. Although we shall refer to means 208 as a "circuit," in one class of embodiments it is a programmed digital computer in which the functions described below are implemented in software.

In one class of embodiments, in the event that circuit 208 determines that the error rate in a block of data is within a preset range, circuit 208 performs error correction thereon. In the event that circuit 208 determines that the error rate in a block of data exceeds a preset level, circuit 208 sends a control signal to automatic analog backup switching circuit 218 (to be described below).

Alternatively, in the event that circuit 208 determines that the error rate in a block of data exceeds a preset level, circuit 208 can "smooth" the data stream by holding the level of the last bit of "good" data until the next "good" data is received. For single row errors, this will result in only 20 microseconds of smoothing of the sound. For longer errors (extending over several rows of digital bit areas), circuit 208 will again smooth the sound for the duration of the error, and will also pass an accelerated error rate signal to error rate integration means 208a. Although means 208a will be referred to below as a "circuit," in one class of embodiments it is a programmed digital computer (which can be the same computer represented by means 208) in which the functions described below are implemented in software.

As the error rate increases, as in the case of a worn film, the probability that corrupt data will be passed correspondingly increases. For this reason, circuit 208a is provided to integrate the error rate over time, and to pass a control signal to low-pass-filter circuitry 208b. The control signal decreases the allowed slew rate of the low pass filters within circuit 208b in response to an increasing integrated error rate. This permits circuit 208b to eliminate unwanted transients in the digital audio channels asserted at the output of circuit 208. The filtered data output from circuit 208b is supplied to digital channel delay circuitry 210.

We contemplate that, following error detection, circuit 208 will perform digital correction of up to 30% of the relevant bits in a block (for the most important digital audio channels). The digital audio channels which have the lowest information content (such as low frequency "Boom" channels) will typically undergo significantly less error correction within circuit 208. We expect that circuit 208 can embody conventional error correction means to accomplish the necessary error correction, if appropriate error code is recorded with the digital audio bits.

Optionally, the data passing through circuit 206 are supplied also to dry contact closure circuit 222. In response to one or more predefined bits from circuit 206, dry contact closures within circuit 222 are activated, thereby asserting control signals to remote theater automation circuitry.

In a class of preferred embodiments, digital channel delay circuitry 210 receives eight filtered digital audio channels from circuit 208b, and delays each channel of filtered digital audio data by a preset period of time (up to two seconds). The delay period can be preset by sending an appropriate control signal from computer 220 to circuit 210 during setup and installation of the FIG. 6 apparatus.

The delayed data from circuit 210 (preferably comprising eight digital audio channels) optionally undergoes further processing within digital mixing circuit 212. As will be explained below with reference to FIGS. 7, 8, and 9, mixing circuit 212 can generate four, six, or eight mixed channels from eight unmixed channels asserted at the output of circuit 210.

Each channel output from mixing circuit 212 undergoes digital equalization within equalizer circuit 214, and the equalized output of circuit 214 is converted to analog form within digital-to-analog conversion means 216. The analog channels output from circuit 216 (consisting of four, six, or eight channels) are supplied to a first set of inputs of automatic analog backup switching circuit 218. Four analog channels (which are preferably +4dBM balanced audio signals representing left, center, right, and surround channels) from analog optical processor 26 are supplied to a second set of inputs of analog backup switching circuit 218.

Automatic analog backup switching circuit 218 normally selects the channels from circuit 216. However, in response to the above-mentioned control signal from error detection/correction circuit 208, switching circuit 218 selects one or more of the analog audio channels from analog optical processor 26. Preferably, less than all the channels from circuit 216 will be so replaced by channels from processor 26. However, in the worst case (when all the digital channels received at circuit 208 have an error rate above a preselected threshold), all the channels from circuit 216 will be replaced by channels from processor 26.

The analog output of switching circuit 218 is supplied to circuit 28 (described above with reference to FIG. 1).

Figure 7:
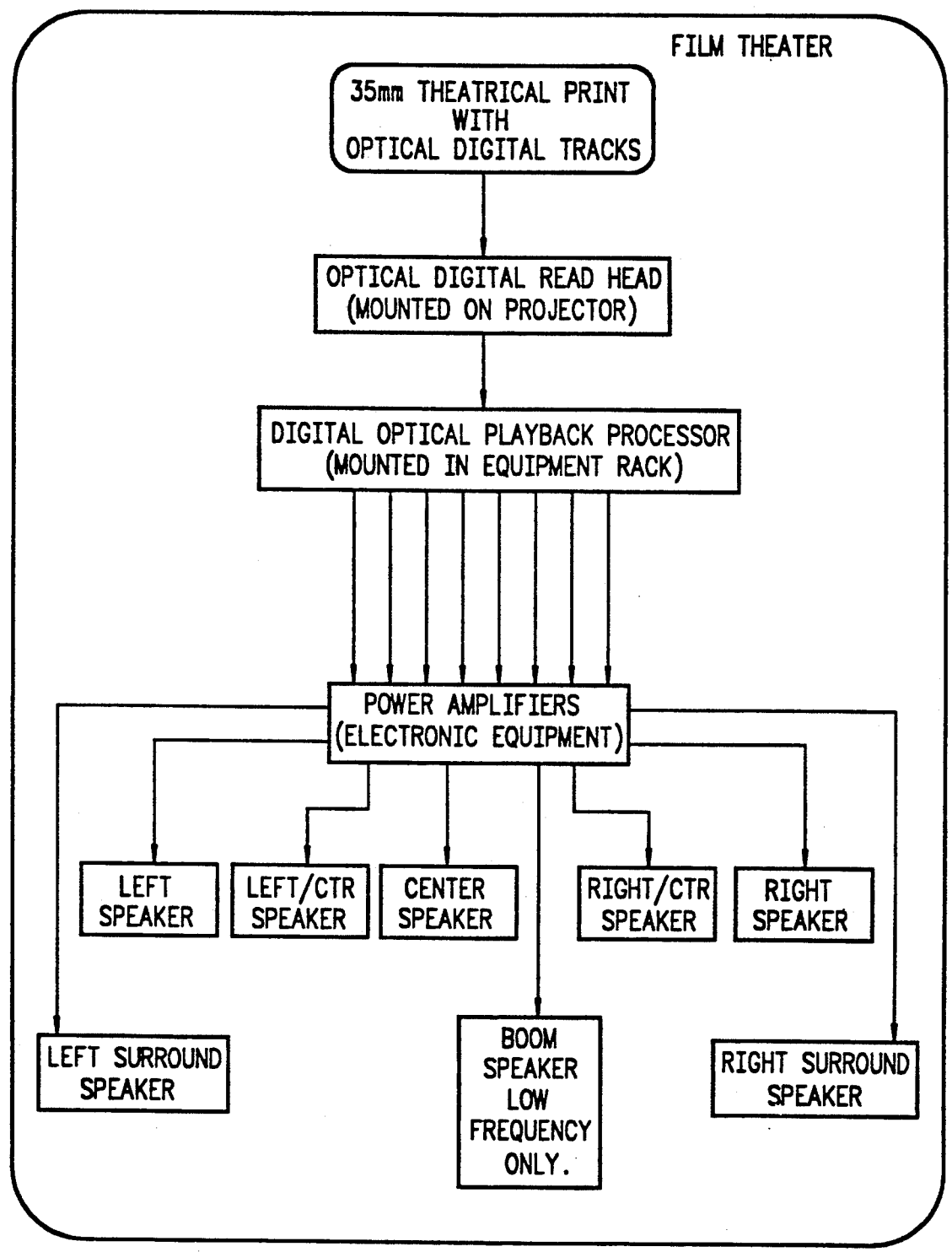
FIG. 7 is a diagram representing signal flow in an embodiment of the invention which outputs eight channels of audio signals.
Figure 8:
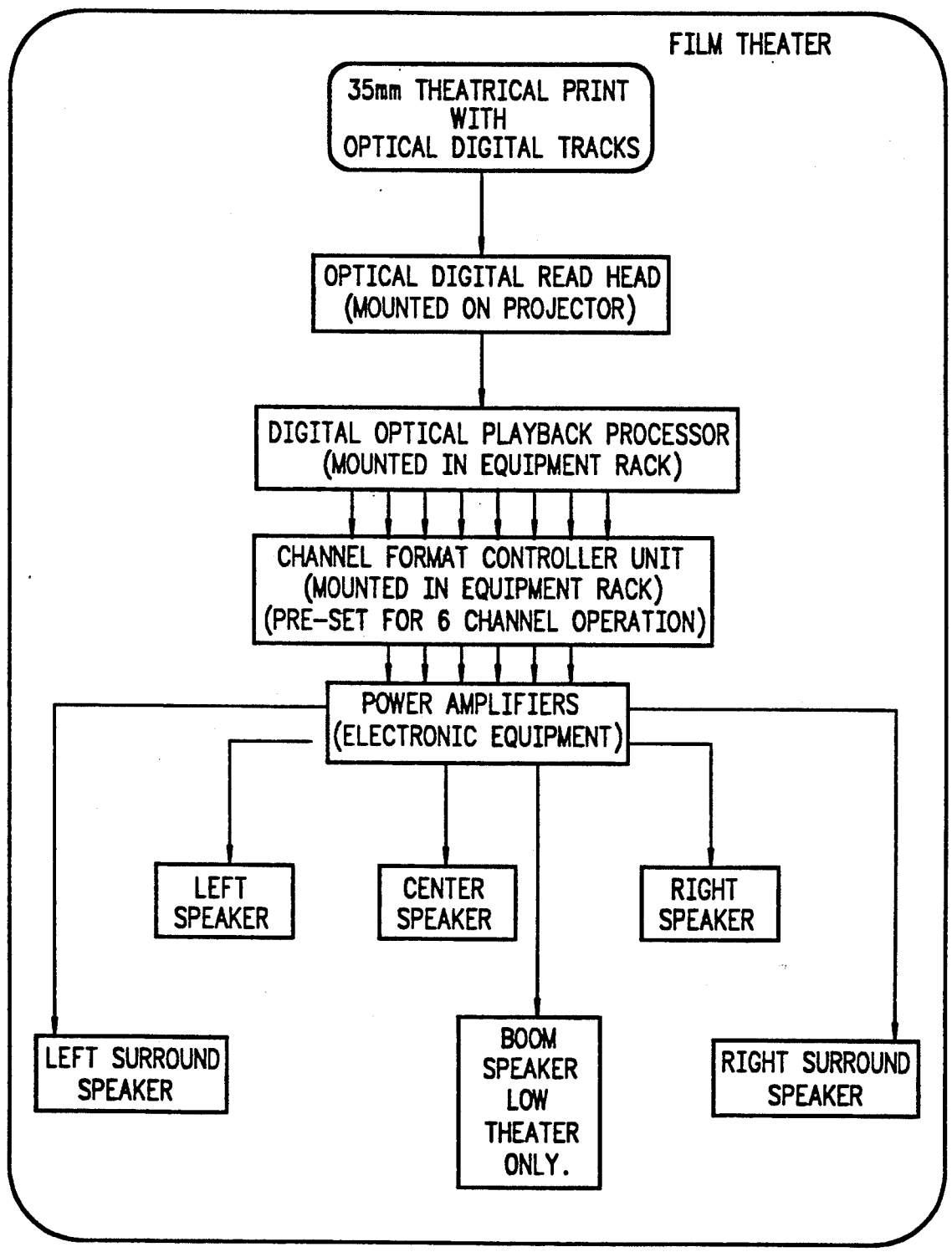
FIG. 8 is a diagram representing signal flow in an embodiment of the invention which outputs six channels of audio signals.
Figure 9:
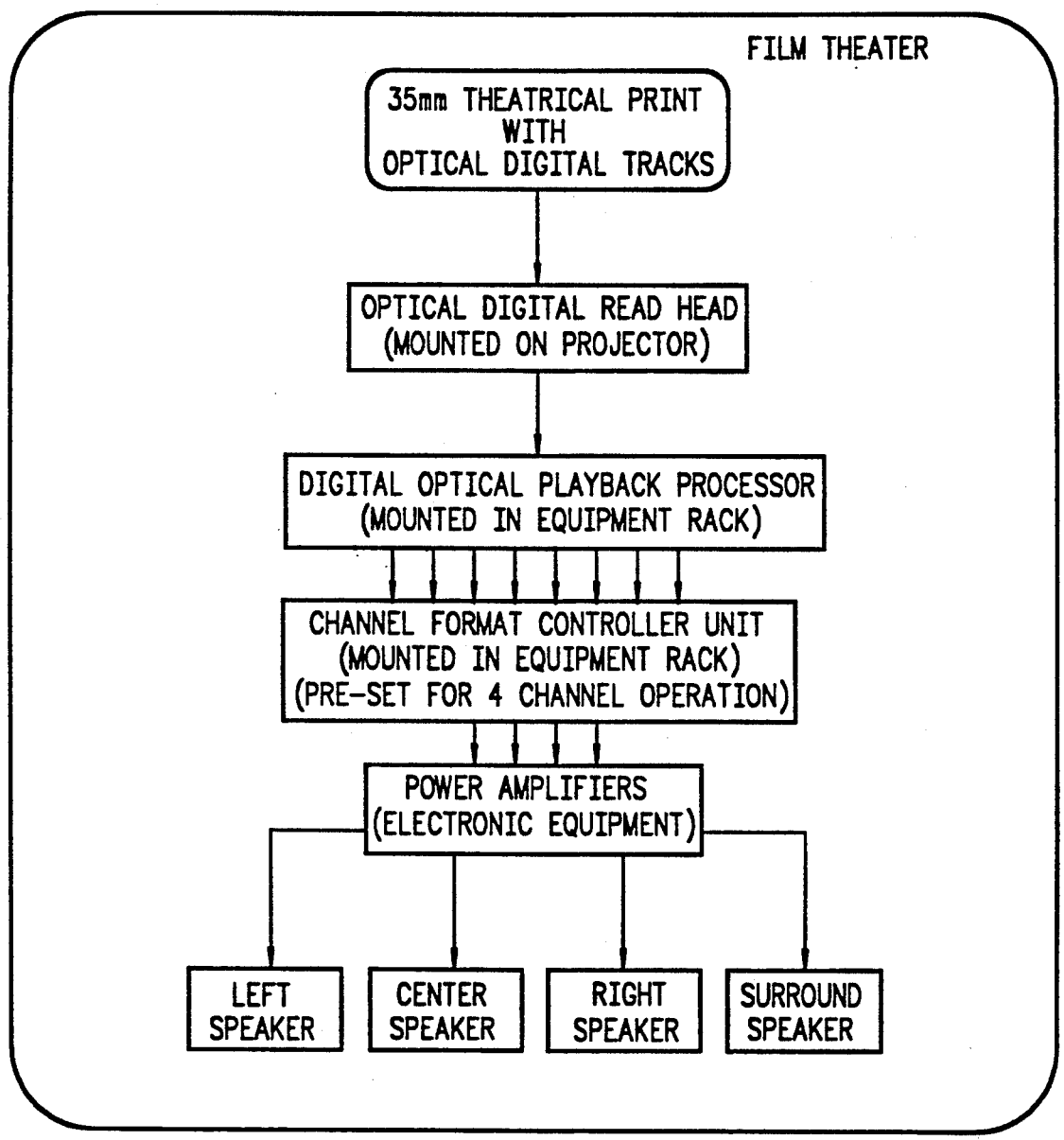
FIG. 9 is a diagram representing signal flow in an embodiment of the invention which outputs four channels of audio signals.

FIG. 7, 8, and 9 represent signal flow in three embodiments of the invention in which mixing circuit 212 outputs eight, six, and four audio channels, respectively. Each of FIGS. 7, 8, and 9 represents a signal processing operation performed in a motion picture film theater in which the inventive apparatus is installed.

FIG. 7 indicates that the inventive digital optical read head (i.e., read head 12 of FIG. 1, which is mounted on film projector 10) sends the digital audio bits that it reads from the motion picture film to the digital optical playback processor (i.e., processor 24 of FIGS. 1 and 6). The digital optical playback processor outputs eight (unmixed) audio channels (in analog form) to a set of power amplifiers, which in turn send each of the eight amplified audio signals to one of the eight indicated loudspeakers. The eight audio channels output from the digital optical playback processor are those identified above with reference to Table 1.

The FIG. 8 embodiment differs from the FIG. 7 embodiment only in that a "channel format controller unit" (e.g., mixing circuit 212 of FIG. 6) within the digital optical playback processor mixes the eight audio channels to generate six mixed audio channel signals. For example, the mixing circuit can mix 75% of the unmixed Left/Center track with the unmixed Left track to generate a mixed "Left" channel, 25% of the unmixed Left/Center track and 25% of the unmixed Right/Center track with the unmixed Center track to generate a mixed "Center" channel, 75% of the unmixed Right/Center track with the unmixed Right track to generate a mixed "Right" channel, and 100% of the unmixed Sub Woofer, Right/Center, and Left/Center tracks to generate a mixed "Sub Woofer" (or "Boom") channel. In the FIG. 8 embodiment, the mixing circuit does not alter the unmixed Left Surround channel or the unmixed Right Surround channel. The six mixed channels asserted (in analog form) at the mixing circuit output (including the unmixed Left Surround and Right Surround channels) are amplified in a set of power amplifiers. The power amplifiers send the six amplified audio signals to the six indicated loudspeakers.

The FIG. 9 embodiment differs from the FIG. 7 embodiment only in that a channel format controller unit (e.g., mixing circuit 212 of FIG. 6) within the digital optical playback processor mixes the eight audio channels to generate four mixed audio channel signals. For example, the mixing circuit can mix 75% of the unmixed Left/Center track with the unmixed Left track to generate a mixed "Left" channel, 25% of the unmixed Left/Center track and 25% of the unmixed Right/Center track with the unmixed Center track to generate a mixed "Center" channel, 75% of the unmixed Right/Center track with the unmixed Right track to generate a mixed "Right" channel, and 50% of the unmixed Left Surround and Right Surround tracks to generate a mixed, mono "Surround" channel. The Sub Woofer channel is not asserted at the output of the mixing circuit (although it may be so asserted in a five channel variation on the FIG. 9 embodiment. The four mixed channels asserted (in analog form) at the mixing circuit output are amplified in a set of power amplifiers. The power amplifiers send the four amplified audio signals to the four indicated loudspeakers.

Figures 10, 10A:
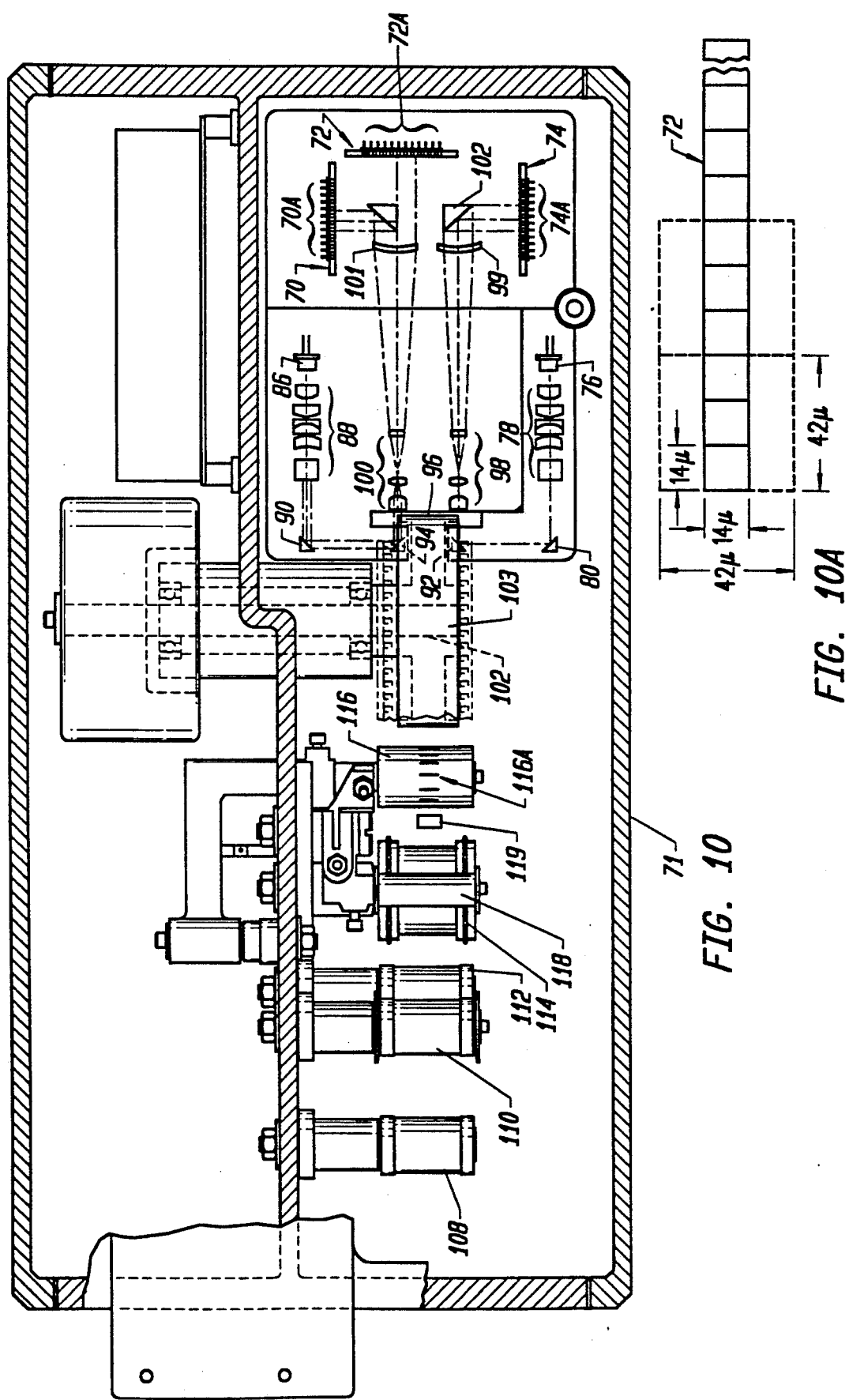
FIG. 10 is a cross-sectional view (in a horizontal plane) of a preferred embodiment of the inventive apparatus for reading multiple, photographically recorded digital soundtracks.
FIG. 10A is a simplified elevational view of detector array 72 of FIG. 10, with spots (shown in phantom view) that have been projected from lens 101 into the plane thereof.
Figure 11:
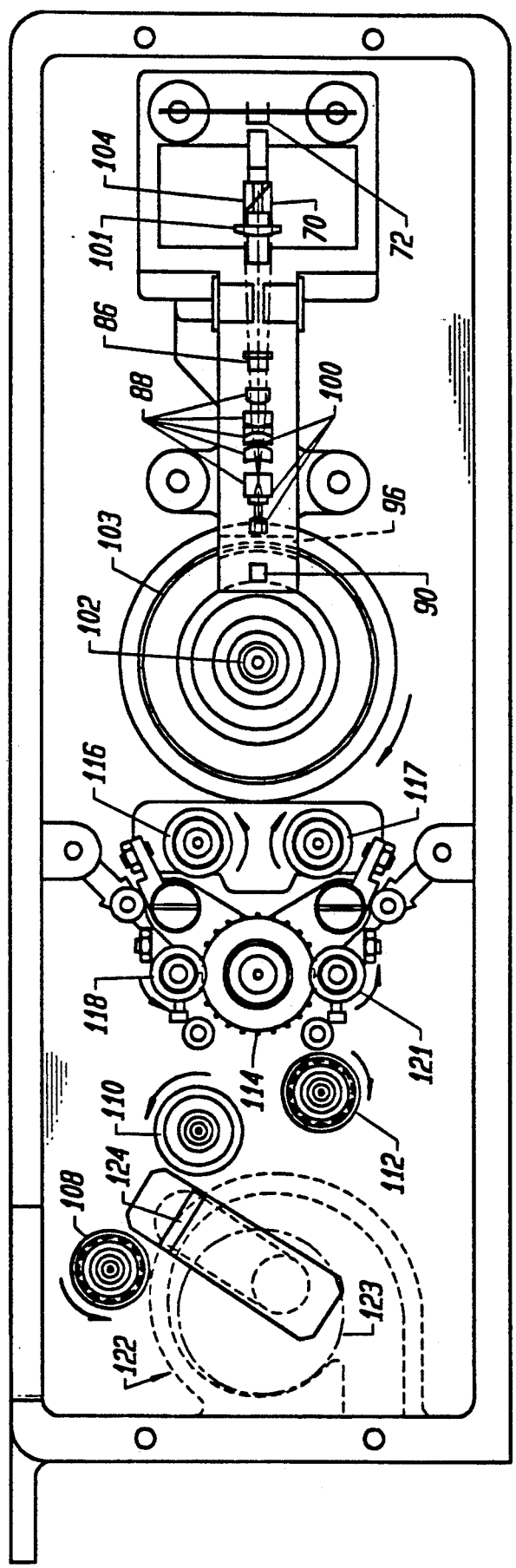
FIG. 11 is a side elevational view of the apparatus of claim 10.

With reference to FIGS. 10 and 11, we next describe a preferred embodiment of an apparatus for optically reading digital audio bits (and other digital data) photographically recorded on a motion picture film.

A motion picture film is wound around sprocket wheels 103, 108, 110, 112, 116, 117, 118, and 121. Drive shaft 102 is rotated (to cause wheel 103 to rotate) and drive member 114 is rotated (to cause wheels 118 and 121 to rotate). As shaft 102 rotates wheel 103 clockwise (as shown in FIG. 11), and member 114 rotates wheel 118 counterclockwise and wheel 121 clockwise (as shown in FIG. 11), the film translates from wheel 108 to wheel 110, from wheel 110 to wheel 118, from wheel 118 to wheel 116, from wheel 116 around wheel 103, from wheel 103 to wheel 117, from wheel 117 to wheel 121, and from wheel 121 to wheel 112. From wheel 112, the film exits the apparatus of FIG. 10 and 11, and typically then enters a film image projector (such as that including lamp means 14 and lens system 16 of FIG. 1).

Each of lasers 76 and 86 is fixedly mounted within housing 71, and each generates a beam of coherent radiation. Preferably, each beam of coherent radiation has a near infrared wavelength within the wavelength range in which detector arrays 70, 72, and 74 (to be discussed below) are most sensitive.

The beam from laser 76 is focused by lens system 78, and is directed by reflective element 80 and then by reflective element 92 through region 96 to lens system 98. Each frame of the motion picture film wound around wheel 103 successively passes through region 96. As the film translates through region 96, the beam from element 92 illuminates a digital soundtrack area which extends along the film's left edge (e.g., area "A" shown in FIG. 2). After passing through this digital soundtrack area, the modulated beam is focused by lens system 98 and lens 99, and is directed by reflective element 102 to detector array 74.

The beam from laser 86 is focused by lens system 88, and directed by reflective element 90 and reflective element 94 through region 96 to lens system 100. As the film translates through region 96, the beam from element 94 illuminates each digital soundtrack area which extends along the film's right edge (e.g., areas "B" and "C" shown in FIG. 2). After passing through these digital soundtrack areas, the beam (which has been modulated by passing through transmissive and opaque bit areas of the film soundtrack areas) is focused by lens system 100 and lens 101. A portion of the beam from lens 101 (which has passed through soundtrack area "C") is directed by reflective element 104 to detector array 70. Another portion of the beam from lens 101 (which has passed through soundtrack area "B") is incident on detector array 72.

Lens system 100 and lens 101 expand the diameter of the modulated beam portion from each of soundtrack areas "B" and "C" so that the projection of each expanded modulated beam portion on one of detector arrays 70 and 72 is a row of spots (representing a row of soundtrack area "A" or "B"), with each spot covering the full width of three adjacent detectors of the receiving array. Similarly, lens system 98 and lens 99 expand the diameter of the modulated beam from soundtrack area "C" so that the projection of the expanded modulated beam on detector array 74 is a row of spots (representing a row of soundtrack area "C"), with each spot covering the full width of three adjacent detectors of the receiving array.

Each projected spot has a height (in a direction perpendicular to the plane of FIG. 10) much greater than the height of each receiving detector. For example, in a typical version of the FIG. 10 apparatus, each projected spot has a length of 42 microns and a width of 42 microns (in the plane of the receiving detectors), and each detector of array 70, 72, and 74 has a length of 14 microns and a width of 14 microns.

As the film translates continuously through region 96 relative to fixedly mounted reflectors 92 and 94, the projection of each spot translates continuously relative to the three adjacent detectors which receive the spot). The output of the three receiving detectors is integrated over the period during which a portion of the spot is projected on the three detectors. When the detectors are CCD detectors, the integration means is simply a CCD readout means 70a (for array 70), a CCD readout means 72a (for array 72), and CCD readout means 74a (for array 74). Each CCD readout means discharges all the detectors in the associated array at the end of a selected time interval, to generate an output signal representing the charge that has accumulated on each detector during such interval.

More generally, the invention reads digital audio bits from bit areas arranged in rows and columns on a photosensitive medium, while the medium is continuously translated along a column axis at a rate R. While the medium is translated, radiation (e.g., a beam of coherent radiation) is projected (for a duration T) through a row of the bit areas and is focused by a lens system onto a row of spots in the plane of a linear array of detectors. Each detector has a length L along a first axis, and a width W along a second axis. The row of spots extends along the second axis. Each of the spots has a width equal to (or greater than) an integral multiple of width W, and each has a length S (along the first axis) greater than L. During the time T, each detector illuminated by a spot integrates the intensity of the radiation incident thereon, thus generating an output signal indicative of integrated spot intensity. Preferably, the parameters R, T, S, and L are selected so that the full area of each detector is fully illuminated by a portion of a single moving spot, during the entire time interval T.

It is desirable to employ a different detector array to read digital data from each of soundtrack areas "A," "B," and "C." In this case, each detector array can be independently selected (or controlled) to have optimal sensitivity to the contrast ratio (between exposed and unexposed bit areas) of the recorded digital soundtrack columns which it reads. Conventional 35 mm motion picture prints typically have an edge portion which includes the analog soundtrack area, and which is coated with an applique (which can be a black and white emulsion containing silver halide) for enhancing the contrast between the analog soundtrack's exposed and unexposed portions. The opposite edge portion has no such applique, and instead consists of ordinary dye. To read the digital soundtracks of a film having such an applique at one edge, detector array 74 can be selected (or controlled) to have optimal sensitivity to the contrast ratio of the plain dye portion of the film, and arrays 70 and 72 can be selected (or controlled) to have optimal sensitivity to the contrast ratio of the film's applique portion.

Each of detector arrays 70, 72, and 74 can be a linear array of CCD (charge coupled device) detectors.

The FIG. 11 apparatus preferably includes a passive "knife edge" vacuum means 122 for cleaning the film portion between sprocket wheels 108 and 110, before such film portion reaches region 96 (where it is illuminated). In a preferred embodiment, vacuum means 122 includes a rotatable vane 123 which is mechanically coupled to the film transport means. When a translating film engages wheels 108 and 110, causing wheels 108 and 110 to rotate counterclockwise (as indicated in FIG. 11), the force exerted on vane 123 by the moving film transport assembly (including the translating film and rotating wheels 108 and 110) causes vane 123 to rotate. As vane 123 rotates, it creates a narrow low pressure region (referred to as a "knife edge vacuum") at region 124 adjacent the translating film. Low pressure region 124 cleans the moving film by pulling contaminating particles away from the film surface. Vacuum means 122 is "passive" in the sense that is actuated by forces mechanically exerted thereon by the film transport assembly.

In the apparatus of FIGS. 10 and 11, detector 119 monitors strobe marks 116A on sprocket member 116. Detector 119 generates an output signal which indicates whether sprocket member 116 is rotating. Since member 116 will rotate only when torque is exerted on it by a translating film, the output signal from detector 119 indicates whether film is translating through the apparatus. The output of detector 119 is supplied to control circuitry 204 (shown in FIG. 6) within digital optical playback processor 24. As explained above, in the event that film ceases to translate through the FIG. 10 apparatus (for example, due to film breakage), control circuitry 204 generates a control signal shutting off power to lasers 76 and 86. This feedback control technique enables the lifetime of lasers 76 and 86 to be maximized.

Various modifications and alterations in the described embodiments of the invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. An apparatus for reading rows of digital audio bits that have been recorded photographically in bit areas of a motion picture film having a longitudinal axis, including:
   a film transport means for continuously translating the film along a path parallel to the longitudinal axis;
   a first array of radiation detectors mounted in a detector plane, wherein each of the detectors in the first array has a length L along a first axis parallel to the longitudinal axis and width W along a second axis substantially perpendicular to the longitudinal axis;
   a first axis means for directing a first laser beam through a first region of the film at a first location along the path, wherein the first region is oriented substantially perpendicularly to the longitudinal axis; and
   first lens means for receiving the first laser beam after it has propagated through the first region, converting the first laser beam into a first expanded beam, and projecting the first expanded beam onto a row of spots in the detector plane, wherein the row of spots extends along the second axis, wherein each of the spots has a length S along the first axis, wherein the length S is greater than the length L, wherein each of the spots has a width, along the second axis, equal to at least an integral multiple of the width W, wherein the bit areas are located within at least two spatially separated elongated soundtrack regions of the film, wherein the elongated soundtrack regions are oriented substantially parallel to the longitudinal axis, and wherein the first region intersects a first one of the elongated soundtrack regions;
   a second array of radiation detectors mounted in a second detector plane, wherein each of the detectors in the second array has a length M along a third axis and a width X along a fourth axis,
   a second laser means for directing a second laser beam through a second region of the film, wherein the second region is oriented substantially perpendicularly to the longitudinal axis and intersects a second one of the elongated soundtrack regions;
   a second lens means for receiving the second laser beam after it has propagated through the second region, converting the second laser beam into a second expanded beam, and projecting at least a portion of the second expanded beam onto a second row of spots in the second detector plane, wherein the second row of spots extends along the fourth axis, each of the spots in the second row has a length T along the third axis, and the length T is greater than the length M;
   a third array of radiation detectors mounted in a third detector plane, wherein each of the detectors in the third array has a length N along a fifth axis and a width Y along a sixth axis; and
   wherein the second lens means projects a portion of the second expanded beam onto a third row of spots in the third detector plane, wherein the third row of spots extends along the sixth axis, each of the spots in the third row has a length U along the fifth axis, and the length U is greater than the length N.

2. A digital optical playback processor, including:
   means for receiving a digital playback signal from a digital optical soundtrack read head, and an analog playback signal from an analog optical soundtrack read head, wherein the digital playback signal is indicative of digital audio bits read from bit areas of a photosensitive medium, and wherein the digital playback signal is also indicative of error code bits read from bit areas of the photosensitive medium;

an error detection and correction means for performing an error detection operation on the digital playback signal and generating an error corrected digital playback signal from the digital playback signal, wherein the error detection and correction means processes blocks of the digital playback signal, and wherein the error detection and correction means includes a means for generating an error rate signal for each of the blocks, a means for integrating the error rate signal to generate a filter control signal, and low-pass-filter means for filtering the error corrected digital output signal in response to the filter control signal to generate a filtered corrected digital playback signal;

digital-to-analog signal from the filtered generating a first analog signalfrom the filtered corrected digital playback signal; and an automatic backup switching means, for receiving the first analog signal, the analog playback signal, and a control signal, and generating an output signal consisting of selected portions of the first analog signal concatenated with selected portions of the analog playback signal in response to the control signal.

3. The process of claim 2, wherein the error detection and correction means includes a means for generating and supplying the control signal to the automatic backup switching means upon determining that one of the blocks has an error rate which exceeds a preset value.

4. The processor of claim 2, also including:

a control means for generating a control signal for deactivating a radiation source within the digital optical soundtrack read head, in response to a feedback signal from the digital optical soundtrack read head, wherein said feedback signal is indicative of whether film is translating through the digital optical soundtrack read head.

5. The processor of claim 2, wherein the digital playback signal includes multiple channels of digital audio data, also including:

a mixing means for generating a mixed digital playback signal indicative of selectively mixed ones of the multiple channels of digital audio data, and wherein the digital-to-analog conversion means generates the first analog signal from the mixed digital playback signal.

6. The processor of claim 5 wherein the mixing means receives eight channels of digital audio data, and wherein the mixed digital playback signal is indicative of six mixed channels of digital audio data.

7. The processor of claim 5 wherein the eight channels of digital data include a Sub Woofer channel, a Right/Center channel, a Surround Left channel, a Right channel, a Center channel, a Left channel, a Surround Right channel, and a Left/Center channel, and the mixed channels of digital data include a mixed Left channel, a mixed Center channel, a mixed Right channel, and a mixed Sub Woofer channel.

8. The processor of claim 5, wherein the mixing means receives eight channels of digital audio data, and wherein the mixed digital playback signal is indicative of four mixed channels of digital audio data, wherein the eight channels of digital data include a Sub Woofer channel, a Right/Center channel, a Surround Left channel, a Right channel, a Center channel, a Left channel, a Surround Right channel, and a Left/Center channel, and wherein the mixed channels of digital data include a mixed Left channel, a mixed Center channel, a mixed Right channel, and a mixed monophonic Surround channel.

9. The processor of claim 2 wherein the low-pass-filter filters the error corrected digital playback signal at a slaw rate determined by the filter control signal.

10. The processor of claim 2, also including:

means for receiving a second digital playback signal from a second digital optical soundtrack read head; and switching means for selecting a desired one of the digital playback signal and the second digital playback signal in response to an externally generated changeover control signal, wherein the digital-to-analog conversion means generates the first analog signal from said desired one of the digital playback signal and the second digital playback signal.

11. A method for processing a digital playback signal from a digital optical soundtrack read head, and an analog playback signal from an analog optical soundtrack read head, wherein the digital playback signal comprises blocks of bits, wherein the digital playback signal is indicative of digital audio bits read from bit areas of a photosensitive medium, and wherein the digital playback signal is also indicative of error code bits read from bit areas of the photosensitive medium, including the steps of:

performing an error detection operation on the digital playback signal to generate an error corrected digital playback signal;

generating an error rate signal for each of the blocks of the digital playback signal;

integrating each said error rate signal to generate a filter control signal;

filtering the error corrected digital output signal in a low-pass-filter means in response to the filter control signal to generate a filtered corrected digital playback signal;

generating a first analog signal from the filtered corrected digital playback signal; and receiving the first analog signal, the analog playback signal, and a control signal, and generating an output signal consisting of selected portions of the first analog signal concatenated with selected portions of the analog playback signal in response to the control signal.

* * * * *